United States Patent
Johnston et al.

(10) Patent No.: US 7,604,825 B2
(45) Date of Patent: Oct. 20, 2009

(54) PROCESS FOR MAKING CHEESE CONTAINING GUM

(75) Inventors: Keith Johnston, Palmerston North (NZ); Allan Main, Palmerston North (NZ); Brian Bennett, Taranaki (NZ); David Hughes, Palmerston North (NZ); Alastair Bruce, Wellington (NZ)

(73) Assignee: New Zealand Dairy Board, Wellington (NZ)

( * ) Notice: Subject to any disclaimer, the term of this patent is extended or adjusted under 35 U.S.C. 154(b) by 203 days.

(21) Appl. No.: 10/381,532

(22) PCT Filed: Sep. 24, 2001

(86) PCT No.: PCT/NZ01/00198

§ 371 (c)(1),
(2), (4) Date: Oct. 6, 2003

(87) PCT Pub. No.: WO02/23999

PCT Pub. Date: Mar. 28, 2002

(65) Prior Publication Data

US 2004/0043111 A1  Mar. 4, 2004

(30) Foreign Application Priority Data

Sep. 22, 2000  (NZ) .................... 507104

(51) Int. Cl.
*A23C 9/12* (2006.01)

(52) U.S. Cl. .................... 426/36; 426/40; 426/573; 426/582

(58) Field of Classification Search .............. 426/34, 426/36, 38, 40, 520, 521, 522, 573, 575, 426/577, 580, 582
See application file for complete search history.

(56) References Cited

U.S. PATENT DOCUMENTS

| 3,012,889 | A |   | 12/1961 | Angerer et al. |
| 4,552,774 | A |   | 11/1985 | Gronfor |
| 4,581,240 | A |   | 4/1986 | Smith |
| 5,080,913 | A | * | 1/1992 | Gamay ................ 426/39 |
| 5,090,913 | A |   | 2/1992 | Kobayashi |
| 5,092,913 | A |   | 3/1992 | Yen |
| 5,277,926 | A |   | 1/1994 | Batz et al. |
| 5,395,630 | A |   | 3/1995 | Gamay |
| 5,532,018 | A |   | 7/1996 | Miller et al. |
| 5,547,513 | A |   | 8/1996 | Mallee et al. |
| 5,665,414 | A |   | 9/1997 | Sherwood et al. |
| 5,679,396 | A |   | 10/1997 | Finnocchiaro |
| 5,709,900 | A |   | 1/1998 | Miller et al. |
| 5,766,656 | A |   | 6/1998 | Bodor et al. |
| 5,807,601 | A |   | 9/1998 | Carpenter et al. |
| 5,895,671 | A |   | 4/1999 | Adamany et al. |
| 5,902,625 | A |   | 5/1999 | Barz et al. |

FOREIGN PATENT DOCUMENTS

| NZ |     303546 | 10/1999 |
| WO | WO 86/00786 |  2/1986 |
| WO | WO 91/17663 | 11/1991 |
| WO | WO 95/01729 |  1/1995 |

OTHER PUBLICATIONS

Baky et al., Dairy Industries International, 1981, pp. 29-31, vol. 46, No. 9, Zagazig University, Egypt.

* cited by examiner

*Primary Examiner*—Leslie Wong
(74) *Attorney, Agent, or Firm*—Knobbe Martens Olson & Bear LLP

(57) ABSTRACT

A process for making cheese comprising the steps: starting with a mil,m composition that has a milk fat content of more than 0.3%, adding a gum preparation to the milk, adding a starter to the milk to form a cheese milk, coagulating the cheese milk, cutting the coagulum to separate curd and whey, draining whey from the curd, and shaping and cooling the curd. The difference over the prior art is the addition of gum to the milk before the starter is added.

40 Claims, 2 Drawing Sheets

NZDRI ATTRIBUTE SCORE CHART FOR PIZZA FUNCTIONALITY

| ATTRIBUTE | DESCRIPTION | SCORE | | SCORE | COMMENTS |
|---|---|---|---|---|---|
| Blister coverage | 0/burnt tips | 1 | 20-25% | 6 | The appearance of burnt tips should be noted |
| | 0-5% | 2 | 25-30% | 7 | |
| | 5-10% | 3 | 35-40% | 8 | |
| | 10-15% | 4 | 40-50% | 9 | |
| | 15-20% | 5 | >50% | 10 | |
| Blister size | 0-5mm | | | 1-2 | Blister integrity (flat, raised scabbed etc) should be described here. |
| | 5-10mm | | | 3-4 | |
| | 10-15mm | | | 5-6 | |
| | 15-20mm | | | 7-8 | |
| | 20-25mm | | | 9-10 | |
| Skinning/ Excessive blistering | None | | | 1-2 | |
| | Slight | | | 3-4 | |
| | Medium | | | 5-6 | |
| | Heavy | | | 7-8 | |
| | Complete crust | | | 9-10 | |
| Blister colour | No colour/v light brown | | | 1-2 | |
| | Light brown | | | 3-4 | |
| | Brown | | | 5-6 | |
| | Dark brown | | | 7-8 | |
| | Black/burnt | | | 9-10 | |
| Background colour (oven + 20 mins) | Transparent | | | 1-2 | |
| | Transparent to white | | | 3-4 | |
| | White to pale yellow | | | 5-6 | |
| | Pale yellow to yellow | | | 7-8 | |
| | Yellow to brown | | | 9-10 | |
| Melt appearance | Complete to moderate unmelt | | | 1-2 | Location (top/underneath) should be noted. Sauce holes or sauce cracks should be noted |
| | Moderate to slight unmelt | | | 3-4 | |
| | Completely melted | | | 5-6 | |
| | Slightly soupy | | | 7-8 | |
| | Soupy | | | 9-10 | |
| Oil off | None to slight | | | 1-2 | |
| | Slight to moderate | | | 3-4 | |
| | Moderate to heavy | | | 5-6 | |
| | Heavy to excessive | | | 7-8 | |
| | Flooded | | | 9-10 | |
| Stretch length | 0-100mm | | | 1-2 | Should be determined 2-3 mins from oven and stretch length based on the average of 3 estimates (NB stretch length cats changed 2/8/01) |
| | 100-200mm | | | 3-4 | |
| | 200-300mm | | | 5-6 | |
| | 300-400mm | | | 7-8 | |
| | >400mm | | | 9-10 | |
| Stretch type | Fibrous with a lot of top tension | | | 1-2 | |
| | Fibrous/ribbon-like with top tension | | | 3-4 | |
| | Thread-like with little top tension | | | 5-6 | |
| | Fine strands /soupy | | | 7-8 | |
| | Fine strands/soup/none | | | 9-10 | |
| Tenderness (initially) | Rubbery/solid-like | | | 1-3 | Should be judged by the initial mouthfeel and then by its texture change during chewing (6-8 chews) |
| | Soft/tender | | | 4-7 | |
| | Watery/liquid-like | | | 8-10 | |
| Tenderness (on chewing) | Forms a bolus on chewing, difficult to swallow | | | 1-2 | |
| | Goes tough/chewy/mealy/dry, difficult to swallow | | | 3-4 | |
| | Goes sl tough/chewy/mealy/dry, easier to swallow | | | 5-6 | |
| | Breaks down on chewing, easy to swallow | | | 7-8 | |
| | Watery, no substance on chewing | | | 9-10 | |
| Flavour | | | | | Should be noted |

FIGURE 3

PROCESS FOR MAKING CHEESE CONTAINING GUM

REFERENCE TO RELATED APPLICATIONS

The present application is the U.S. National Phase of PCT/NZ01/00198, filed Sep. 24, 2002 and claims priority under 35 U.S.C. §120 to New Zealand Patent Application No. 507104, filed Sep. 24, 2001.

FIELD OF THE INVENTION

The present invention relates to a novel process of making cheese containing gum, specifically although by no means exclusively, to a process of making mozzarella or mozzarella-like (pizza) cheese containing gum, and to a cheese product made by said process.

BACKGROUND OF THE INVENTION

Recent cheese making processes have concentrated on the production of low fat, low cholesterol and fat free cheeses which have the texture and flavour of full fat cheese, for the increasing health conscious public and also aimed at the weight reduction and slimming food market.

In particular, a number of substances have been added to the cheese making process as fat replacement agents including starch (U.S. Pat. No. 5,547,513; U.S. Pat. No. 5,679,396; U.S. Pat. No. 5,277,926; U.S. Pat. No. 5,807,601; U.S. Pat. No. 4,552,774; U.S. Pat. No. 5,665,414); gums, such as carrageenan, xanthan, agar, alginate, guar and cellulose gels (U.S. Pat. No. 5,895,671; U.S. Pat. No. 5,395,630; U.S. Pat. No. 5,090,913; WO 86/00786); as well as both starches and gums together or in combination with other additives such as emulsifiers, flavours, stabilisers, colourants, dairy solids, cheese powders, and the like, (U.S. Pat. No. 5,902,625; U.S. Pat. No. 5,895,671; NZ 303546; U.S. Pat. No. 5,679,396; U.S. Pat. No. 5,532,018). In particular, the starting milk for these processes is either fat free or contains less than 0.3% fat (U.S. Pat. No. 5,395,630; U.S. Pat. No. 5,090,913).

Carrageenan appears to be a preferred gum in the prior art processes and has been used in a number of instances to enhance production of low fat cottage cheese and soft acid set coagulated cheeses. These methods have involved the use of carrageenan to tie up protein material from whey thereby increasing the yield levels (WO 86/00786).

To date, there is no teaching that gums, such as carrageenan may be useful in a process of cheese making wherein the starting milk has a relatively high fat content to produce low, reduced or full fat cheese, including what processing parameters would be required to produce such cheeses.

In addition, for all cheese making processes it is important to maintain the compositional and functional characteristics of the final cheese product at a standard acceptable by the industry and consumer.

In particular, melt and flavour characteristics are important for mozzarella cheese especially for cheese made for the pizza making industry. Any method of cheese making that can provide flexibility in the functional characteristics of the end cheese product gives the cheese making industry a way of producing a wide variety of cheese having the required functional characteristics in a consistent manner. This is beneficial to the cheese making industry, large consumers such as the pizza industry, as well as individual consumers.

It is an object of the present invention to provide such a process and/or at least to provide the public with a useful choice.

SUMMARY OF THE INVENTION

In a first embodiment, the present invention provides a process of manufacturing cheese wherein a gum preparation is added to a milk composition before being pasteurised, the milk is then ripened with a starter culture and/or acid to produce a cheese milk and the cheese milk coagulated. The coagulum is cut to separate curd from whey and the whey drained therefrom. The curd is then shaped and cooled.

In a second embodiment, the present invention provides a process of manufacturing cheese wherein a gum preparation is added to a pre-pasteurised milk composition. The milk is then ripened with a starter culture and/or acid to produce a cheese milk and the cheese milk coagulated. The coagulant is cut to separate curd from whey and the whey drained therefrom. The curd is then shaped and cooled.

Other additives common to cheese making process may be added at any suitable stage of the above mentioned processes to alter any functional characteristic or improve flavour, texture, colour and the like, as would be understood by a person of skill in the art.

The cheese made by the above processes may comprise soft, semihard, hard and extra hard cheeses including mozzarella whereby the mozzarella is made without a heating and stretching step.

However, more traditional mozzarella cheese making processes may be employed which include a heating and stretching step. Thus, in a third embodiment, the present invention provides a process of manufacturing a mozzarella or mozzarella-like (pizza) cheese wherein a gum preparation is added to a milk composition and the milk composition pasteurised. The milk is then ripened with a starter culture and/or acid to form a cheese milk, and the cheese milk coagulated. The coagulum is cut to separate curd from whey and the whey drained therefrom. The curd is then heated and stretched, extruded, molded and cooled.

In a fourth embodiment, the present invention provides a process of manufacturing a mozzarella-like cheese wherein a gum preparation is added to a pre-pasteurised cheese milk composition. The milk composition is then ripened with a starter culture and/or acid to form a cheese milk, and a the cheese milk coagulated. The coagulum is cut to separate curds from whey and the whey drained therefrom. The curd is then heated and stretched, extruded, molded and cooled.

Other additives common to cheese making process may be added at any suitable stage of the above mentioned processes to alter any functional characteristic or improve flavour, texture, colour and the like, as would be understood by a person of skill in the art.

The present invention also provides a cheese produced by the processes of the invention which surprisingly have enhanced functional properties.

In particular, the present invention is directed to a mozzarella or mozzarella-like (pizza) cheese produced by a process according to the invention that surprisingly has enhanced functional properties. By mozzarella and mozzarella-like (pizza) cheese is meant a cheese made using a process of the present invention, which has stringy characteristics on melting.

DESCRIPTION OF THE FIGURES

The present invention will now be described with reference to the figures of the accompanying drawings in which:

FIG. 3 shows a score chart for assessing functionality of the cheese made by the process of the invention.

DETAILED DESCRIPTION OF THE INVENTION

The present invention provides an alternative process of making a cheese containing gum, whereby said gum results in an increase in moisture content and improved functional characteristics of said cheese. When the cheese is mozzarella or mozzarella-like (pizza) cheese, such functional characteristics include improved melt and sensory characteristics that are especially desirable in the pizza making industry.

Previously, gums such as carrageenan have been added in cheese making processes as fat replacers in processes for producing fat free or low fat cheese products. It was the aim of such processes to provide a low fat or fat free cheese product which had the same texture and flavour as their full fat cheese counterparts. In these prior art processes, the gums were added at various stages of the cheese making process, more usually at the salting stage, and often required further additives to interact with the gums and the whey proteins. In addition, it was also a requirement of these prior art processes to begin the cheese making process with fat free or low fat (less than 0.3%) starting milk.

The process of the present invention provides for the first time, the processing parameters required to make a low, reduced or full fat cheese, including mozzarella or mozzarella-like (pizza) cheese, containing gum from a starting liquid milk containing is relatively normal fat content, as well as the cheeses made by the process of the invention having enhanced functional properties.

In particular gum is not added to the fat containing starting milk composition in the processes of the present invention as a fat replacer, but as a functionality enhancer and provides cheese with an increase in moisture content and enhanced functional characteristics. In particular, the molten or cooked mozzarella or mozzarella-like (pizza) cheese made according to the process of the invention has improved melt and flavour characteristics. Without being bound by theory, it is thought that the gum, in solution, is activated by heat enabling interaction with the casein before the coagulation step. In the case of the processes whereby gum is added to the starting milk before the pasteurisation step, the heat of pasteurisation is thought to activate the gum solution. Where gum is added to a pre-pasteurised starting milk composition, a number of heating steps in the process could activate the gum. For example, when a gum solution is pre-heated (for sterilisation purposes) before being added to the starting milk or by the temperature of the cheese milk during coagulation or, during the heating and stretching step in embodiments which include such a step.

The description will now be limited to the process of making mozzarella or mozzarella-like cheese, but it will be understood by a skilled person that any other type of cheese may be made by the processes of the present invention.

The present invention provides a process of making mozzarella or mozzarella-like (pizza) cheese comprising the steps:

a. providing a starting milk composition having a selected protein and fat composition, wherein said starting milk has a fat content of more than 0.3%;
b. adding a gum preparation to the milk composition of step a;
c. pasteurising the milk composition of step b;
d. adding a starter culture and/or acid (mineral and/or organic) to the milk composition to form a cheese milk;
e. coagulating the cheese milk composition;
f. cutting the coagulum to separate curd and whey;
g. draining away the whey from the curd; and
h. shaping and cooling the curd.

Preferably, the process further comprises a step of heating and stretching the curd at a curd temperature of between about 50° C. to 80° C. after step g, and before step h.

Figure 1:
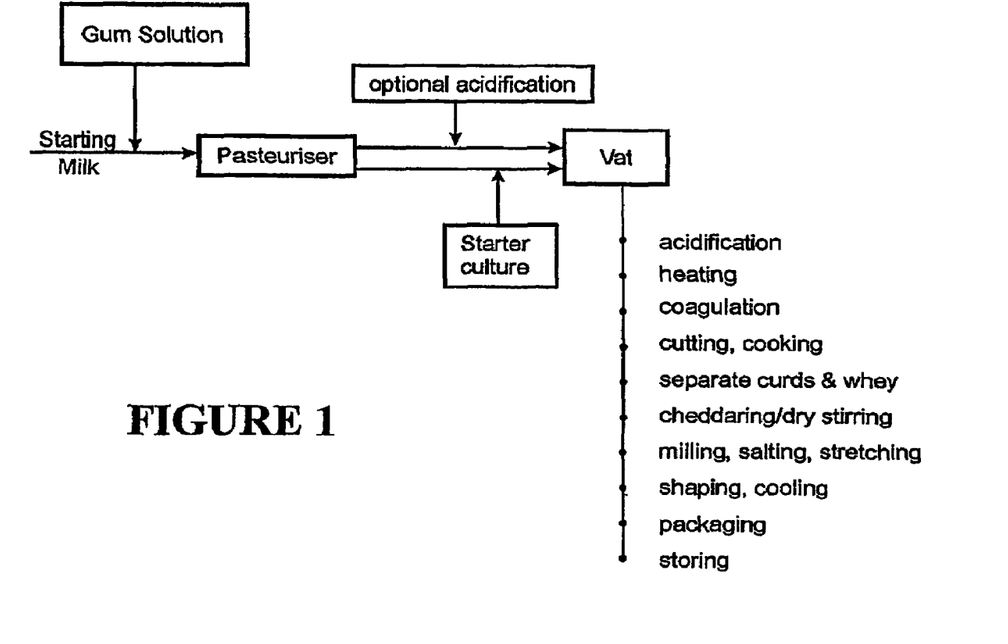
FIG. 1 shows a schematic drawing of the process of a first embodiment of the invention.

The general steps of this preferred process are set out in FIG. 1.

The starting milk may be selected from one or more of the group comprising whole fat milk; semi skimmed milk; skimmed milk; butter milk; butter milk retentate/concentrate and whey protein retentate/concentrate or from products made from milk as would be appreciated by a person skilled in the art. One or more powders, such as whole milk powder, skimmed milk powder, whey protein concentrate powder, whey protein isolate powder and buttermilk powder or other powders made from milk, reconstituted or dry, singularly or in combination may also be selected as the starting milk or be added to the starting milk.

The starting milk may be sourced from any milk producing animal.

The protein and fat composition of the starting milk composition is altered by a process known as standardisation to give a protein/fat ratio of between 0.5:1 and 6.0:1. The process of standardisation involves removing the variability in the fat and protein composition of the starting milk to achieve a particular end cheese composition. Traditionally, standardisation of milk has been achieved by removing nearly all the fat (cream) from the starting milk (separation) and adding back a known amount of cream thereto to achieve a predetermined protein/fat ratio in the cheese milk. The amount of fat (cream) required to be removed will depend upon the fat content of the starting milk and the required end cheese composition. However, the cheese milk has a fat content of at least 0.3%, preferably 0.5-6.0% fat to give concentration in the final cheese product of between about 4-30 wt %. Additionally or alternatively, the protein concentration may be altered by adding a protein concentrate such as a UF retentate or powder concentrate to a milk starting composition, or by any other method as would be appreciated by a person skilled in the art.

The gum is selected from one or more of the group comprising kappa carrageenan, iota carrageenan, lambda carrageenan, locust bean gum, alginate, xanthan, cellulose gum, guar, and any other suitable hydrocolloid.

Preferably the gum is a carrageenan and most preferably the gum is predominantly kappa carrageenan.

The gum preparation may be a dry powder or a solution. The gum preparation is preferably a solution whereby a gum powder is dispersed in either water or milk at concentrations of between about 1 and 25 wt %, preferably between about 8-12 wt %, at temperatures of between 2° C. and 30° C. to prepare a bulk gum solution. Sufficient bulk gum solution is then added to the standardised starting milk before pasteurisation to give a concentration of gum in the starting milk of between about 0.005-0.25 wt %, preferably 0.010-0.2 wt %, most preferably between about 0.015-0.15 wt %. Such concentrations of gum in the staring milk result in a gum concentration in the final starting milk of approximately $1.00\text{-}100 \times 10^{-3}$ g/g of protein, preferably $1.4\text{-}60 \times 10^{-3}$ g/g of protein, most preferably $4.0\text{-}45 \times 10^{-3}$ g/g of protein. It is has been demonstrated, surprisingly, that up to 95% of the gum present in the starting milk will be retained in the final cheese product. As the gum preparation is added to the starting milk before pasteurisation in this embodiment it does not require separate pasteurisation.

Pasteurisation of the starting milk takes place under standard conditions, namely, heat treating the milk at a temperature and time sufficient to kill pathogens, (typically 72° C. for 15 seconds).

After pasteurisation, the standardised starting milk is transferred to a fermentation vat at a suitable temperature, generally chosen to prevent localised protein precipitation during acidification.

A bulk starter culture and food grade acid (at approximately 10%) are added to the starting milk in order to lower the pH of the milk to a preferred pH of about $\geq 5.2$ to form a cheese milk. Alternatively, the pH may be lowered by starter culture alone, or by direct acidification alone as would be appreciated by a person skilled in the art.

The starter culture can be mesophilic or thermophilic or a mix and added at 0.1-2.0% (neutralised) or 0.1-6.0% (unneutralised) of the milk volume. Examples of starter cultures are: *Streptococcus themophilus, Lactobacillus bulgaricus, Lactobacillus helveticus, Lactococcus lactis* subspecies *cremoris, Lactococcus lactis* subspecies *lactis.*

The starter culture may be added to the starting milk either whilst the milk is en-route to the fermentation vat or once it is in the vat. Likewise acidification may take place either en-route or once the starting milk is in the vat.

Where direct acidification is required, sufficient food grade acid (preferably an organic acid) at an appropriate dilution is added to reduce the pH of the pasteurised standardised milk to between pH 5.2 and normal milk pH.

Once the starter culture and acid (if required) have been added, the milk is heated to its set temperature (30-44° C.) depending on the starter culture used. The starter culture may be allowed to grow and the pH to drop further before addition of a coagulant such as a coagulating enzyme. Coagulating enzyme (eg chymosin in rennet, microbial rennet) may be added to the cheese milk to aid in the cheese milk being converted from a liquid to a gel or semi solid at 30° C. to 42° C. as is known by those skilled in the art After a coagulum has been formed and reached an adequate firmness, the curd is cut to give curd particles suspended in whey. The temperature of the curd and whey mixture is raised to the cook temperature at a rate of approximately 1° C./6 min and the curd and whey are then cooked at a cook temperature of between 36° C. to 44° C. The exact cook temperature will vary depending on the starter culture used and final cheese moisture targets as would be understood by a person of skill in the art.

During the cooking phase the curd is stirred and can also be washed by draining a portion of the whey from the vat and adding back the same volume of water, or by adding back less or more water than the volume drained, or by adding water without draining any whey. It is also possible to add hot water to wash and cook the curd at the same time.

The curd is cooked until a target pH is reached and the curd is then separated from the whey by allowing the whey to drain from the curd.

Through the action of the residual starter bacteria the pH of the fresh curd is allowed to drop to a target level of between 5.0-6.0. The pH can be adjusted using organic or mineral acid if required or by adding an acidity regulator (eg Glucono Delta Lactone—GDL). The time between cutting and draining is dependent on the starter system used, the cooking temperature and the draining pH target.

The drained curd may be allowed to knit together to form a 'chicken-breast' structure, a process that results in a continuous mat of curd. Alternatively the curd may be dry stirred and/or pressed in block form. The time required for the curd to knit together in a solid mass is dependant on the starter system used, the cooking temperature and the milling pH target as would be understood by a skilled artisan.

At a target pH the curd is milled. Milling involves cutting the mat of cheddared curd into finger-sized pieces of curd which can be easily and effectively salted.

In more traditional mozzarella processes only a portion of the salt is added at this point or none at all. In these cases salt is added during stretching and/or brining after stretching.

If salt is added after milling, time is allowed for the salt to penetrate the curd (mellowing).

The heating and stretching step takes place at a curd temperature of between about 50° C. and 80° C. and may occur by immersing the curd in hot water or hot whey as in the traditional method, or may be heated and stretched in a dry environment as described in U.S. Pat. No. 5,925,398. In either method, the curd is heated and stretched into a homogenous, plastic mass. Preferably the curd is heated to a curd temperature of between about 50° C. to 71° C. using equipment common in the art, such as a single or twin screw stretcher/extruder type device or steam jacketed and/or infused vessels equipped with mechanical agitators (waterless cookers).

Traditionally the hot curd is immediately extruded into molds or hoops and the cheese cooled by spraying chilled water/brine onto the surface of the hoops. This initial cooling step hardens the outside surface of the block providing some rigidity. Following this initial cooling the cheese is removed from the molds and placed in a salt brine (partially or completely saturated) bath for a period of time to completely cool the cheese and enable uptake of the salt to the required level. Once cooled the cheese is placed in plastic liners, air removed and the bag is sealed Alternatively, hot stretched curd may be extruded into sheet-like form and directly cooled without molding.

An alternative process sometimes used in commercial practice is to completely dry salt the curd, mellow, stretch and pack directly into plastic liners contained in hoops and the liners sealed. The hoops plus cheese are then immersed in chilled water. Cooled cheese is stored at between 2° C. to 10° C. Once ready for use the cheese may be used directly or the block frozen or the block shredded and the shred frozen.

It is also possible to produce a mozzarella or mozzarella-like (pizza) cheese by the processes of the present invention which does not include a heat stretch step, as described in U.S. Pat. No. 5,942,263.

Other additives common to the cheese making process may be added, including non-dairy ingredients such as stabilisers, emulsifiers, natural or artificial flavours, colours, starches, water, additional gums, lipases, proteases, mineral and organic acid, structural protein (soy protein or wheat protein), and anti microbial agents as well as dairy ingredients which may enhance flavour and change the protein to fat ratio of the final cheese. Such additives may be added at any suitable step in the process as would be understood by a person skilled in the art. For example, salts such as calcium chloride are useful in aiding coagulation and may be added with the starter culture during coagulation. The flexibility of allowing any combination of additives to be added at any step in the process allow the final composition of the cheese to be precisely controlled, including the functionality characteristics.

In a further embodiment, the present invention provides a process of making a mozzarella or mozzarella-like (pizza) cheese comprising the steps:
a. providing a starting milk composition having a selected protein and fat composition, wherein said starting milk has a fat content of more than 0.3%;
b. pasteurising the milk composition of step a;
c. adding a gum preparation to the milk composition of step b;

d. adding a starter culture and/or acid (organic or mineral) to the milk composition to form a cheese milk;
e. coagulating the cheese milk composition
f. cutting the coagulum to separate curd and whey;
g. draining away the whey from the curd; and
h. shaping and cooling the curd.

Preferably the process further comprises a step of heating and stretching the curd at a curd temperature of between about 50° C. to 80° C. after step g and before step h.

Figure 2:
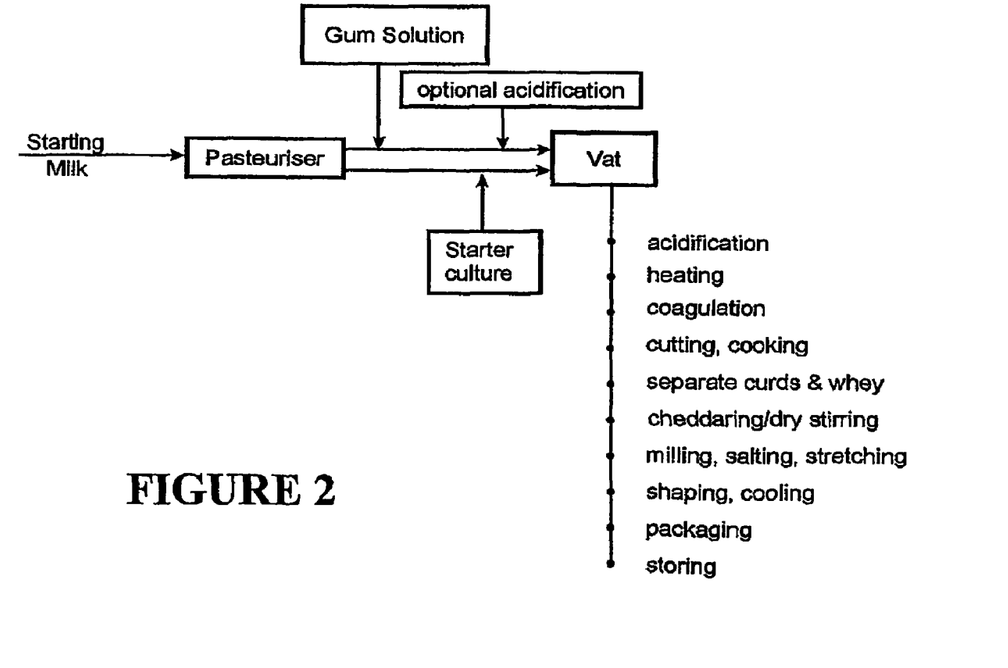
FIG. 2 shows a schematic drawing of the process of a second embodiment of the invention.

The general steps of this process are set out in FIG. 2. The starting milk is selected and standardised as described above.

The gum is selected from one or more of the group comprising kappa carrageenan, iota carrageenan, lambda carrageenan, locust bean gum, alginate, xanthan, cellulose gum, guar, and any other suitable hydrocolloid.

Preferably the gum is a carrageenan and most preferably the gum is predominantly kappa carrageenan.

The gum preparation may be a dry powder or a solution. The gum preparation is preferably a solution whereby a gum powder is dispersed in either water or milk at concentrations of between 1 and 25 wt %, preferably 8-12 wt %, to prepare a bulk gum solution. The bulk gum solution may be heated for sterilization purposes and/or to activate the gum before adding to the cheese milk. Sufficient bulk gum solution is then added to the standardised pre-pasteurised starting milk to give a concentration of gum in the starting milk of between about 0.005-0.25 wt %, preferably between about 0.010-0.2 wt %, most preferably between about 0.015-0.15 wt %. Such concentrations of gum in the starting milk result in a gum concentration in the milk of approximately $1.00\text{-}100\times10^{-3}$ g/g of protein, preferably $1.4\text{-}60\times10^{-3}$ g/g of protein, most preferably $4.0\text{-}45\times10^{-3}$ g/g of protein. It is expected that up to 95% of the gum preparation will be retained in the final cheese product. The gum may be added to the pasteurised starting milk either en-route to the fermentation vat or once the pasteurised starting milk has been transformed in the vat.

The coagulation, cutting, draining, heating, stretching, shaping, packaging, etc steps are carried out as described above. In addition, as discussed above, the cheese may be produced without a heating and stretching step as described in U.S. Pat. No. 5,942,263.

Again, other additives common to the cheese making industry may be added to control the final functionality characteristics of the cheese product. Such additives include non-dairy ingredients such as stabilisers, emulsifiers, natural or artificial flavours, is colours, starches, water, additional gums, lipases, proteases, mineral and organic acid, structural protein (soy protein or wheat protein), and anti microbial agents as well as dairy ingredients which may enhance flavour and change the protein to fat ratio of the final cheese. Such additives may be added at any suitable step in the process as would be understood by a person skilled in the art. For example, salts such as calcium chloride are useful in aiding coagulation and may be added with the starter culture during coagulation.

In a further embodiment, the present invention provides a mozzarella or mozzarella-like cheese product produced by the processes of the invention. Such cheese has improved functionality characteristics on cooking including:
  decreased blister size
  increased blister coverage
  whiter background colour (of the melted cheese)
  a more tender mouthfeel while retaining good stretch characteristics
  reduced oiloff
  reduced transparency In addition the inclusion of the gum in the process of the present invention:
  increased cheese yield (total kg cheese)
  improved shredability/diceability
  increased the window of functional acceptance.

The present invention also provides a food product comprising the mozzarella or mozzarella-like cheese of the present invention, such as a pizza.

Any ranges mentioned in this patent specification are intended to inherently include all of the possible values within the stated range.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

The invention consists in the foregoing and also envisages constructions of which the following gives examples.

General Manufacturing Protocol

Starting milk (with varying protein to fat ratios, typically 1.3) was pasteurised (72 C/15 s) and various gums at varying concentrations (eg Gelcarin CH7352, a commercial kappa carrageenan product supplied by FMC, 6-10% dispersed in milk or water) was added to the milk before or after pasteurisation as set out below for each example. A range of starter milk gum concentrations were evaluated (typically 0.025%).

A culture of lactic acid producing bacteria plus dilute acetic acid was added to the pasteurised milk and gum compositions to bring the pH down to 6.10-6.20 to produce a cheesemilk. The cheesemilk was heated to 36° C. and a coagulant (Chymax or Fromase) was added and the cheesemilk allowed to set. The coagulum was cut and stirred for approximately 35-50 minutes and then the whey was drained from the curd. The curd was then allowed to knit together for approximately 45-60 minutes and then milled. Sufficient salt was added to the milled curd to reach a target of 1.4% in the final cheese. After mellowing the salted curd was stretched at curd temperature of 58-60° C., packaged and molded and cooled in chilled water. Final cheese was stored at approximately 5° C. until ready for functionality evaluation.

Example 1

Mozzarella/Mozzarella-Type Cheese Made where Gum has been Added Prior to Pasteurisation In this example 4 cheeses were made according to the protocol described above. Cheeses 1 and 3 were the control cheeses where no gum was added. In cheeses 2 and 4, Gelcarin CH7352 was added to the starter milk (0.025%) before pasteurisation. Composition and functionality results for these cheeses are shown in Tables 1 & 2 respectively.

TABLE 1

| | Chemical composition | | | |
|---|---|---|---|---|
| Cheese No. | 1 | 2 | 3 | 4 |
| Fat (%) | 21.0 | 20.0 | 21.5 | 19.5 |
| Moisture (%) | 46.9 | 48.6 | 47.3 | 49.3 |
| Salt (%) | 1.27 | 1.32 | 1.36 | 1.39 |
| PH | 5.44 | 5.47 | 5.48 | 5.50 |

TABLE 2

| | Functionality* | | | |
|---|---|---|---|---|
| Age of cheese tested | 6 weeks | | 4 weeks | |
| Cheese No. | 1 | 2 | 3 | 4 |
| Blister coverage (%) | 5-10 | 20-25 | 10-15 | 10-15 |
| Blister size (mm) | 5-10 | 5-10 | 5-10 | 0-5 (on average smaller than control) |
| Background colour | White/pale yellow | Whiter than control | White/pale yellow | Whiter than control, greater yield, less transparency |
| Melt | Complete, sauce colour showing through | Complete, no sauce colour showing through | Complete | Complete |
| Oil Off | Slight | Less that control | Slight | Less than control |
| Stretch length (mm) | 300 | >400 | >400 | 300-400 |
| Stretch type | Fibrous/webby | Fibrous | Slightly fibrous | Fine |
| Tenderness | Initially tender, goes slightly chewy on further chewing although some breakdown in mouth | Initially tender, breaks down in the mouth on further chewing and more tender than control | Initially tender, goes tough, chewy and mealy on further chewing | Initially tender, less mealy on chewing and breaks down in the mouth. |
| Flavour | Bland | Bland | Bland | Bland |

*Functionality assessed by pizza test. Pan base, 140 g sauce, 305 g cheese, baked for 7 min at 250° C.

Example 2

Mozzarella/Mozzarella-Like Cheese Made where Gum was Added Prior to Pasteurisation Five cheeses (5 Controls and 5 experimental) were made using the manufacturing protocol as described above, and the functionality assessed using the pizza test as above, when the cheeses were 6 weeks old, and again when the cheeses were 9-12 weeks old. The description of the functional parameters as set out in Table 2, was replaced by a score system in this and later examples in an attempt to more easily compare control and test cheese batches and also to enable the scores of multiple analyses to be averaged out. The score sheet used to assess functionality is set out in FIG. 3.

The assessment of functionality for these cheeses is shown below in Table 3. Each score is an average of the functional scores for five cheeses.

TABLE 3

| | Functionality | | | |
|---|---|---|---|---|
| Age of cheese tested | 6 weeks | | 9-12 weeks | |
| Cheese type | Control | 0.025% gum* | Control | 0.025% gum* |
| Blister size | 5.64 | 4.02 | 6.80 | 4.02 |
| Background colour | 6.78 | 4.88 | 7.06 | 4.88 |
| Oil Off | 2.70 | 2.16 | 2.94 | 2.54 |
| Tenderness in mouth | 3.60 | 4.72 | 3.38 | 5.48 |
| Tenderness on chew | 4.16 | 5.64 | 3.74 | 5.94 |
| Moisture content (%) | 49.00 | 50.58 | 49.00 | 50.58 |

*kappa carrageenan

Results

From the results set out in the functionality Tables 2 and 3 above, it will be seen that the mozzarella cheese made according to the process of the present invention, whereby 0.025 wt % kappa carrageenan was added to the standardised cheese milk prior to pasteurisation, having a protein:fat ratio of 1.3 and initial fat content of approximately 2.6%, resulted in a cheese having improved functionality parameters as compared with a control cheese made without added gum. In particular, blister coverage, blister size, background colour, melt, oil off, stretch length, stretch type and moisture content were all improved in a standard in-house pizza test (details of which are available upon request). The beneficial properties of gum containing cheese increased when tested in mozzarella aged 9-12 weeks compared to 6 week old cheese (Table 3).

Example 3

Mozzarella Cheese Made with Different Types of Gum

The manufacturing protocol was as described above, and the functionality of each single cheese made, tested by the pizza test as above when the cheeses were 9 weeks old. The score results in Table 4, below are the average of 3 evaluators.

TABLE 4

| | Functionality | | | |
|---|---|---|---|---|
| Cheese type | Control | K-C | LBG | Guar |
| Blister coverage | 5.8 | 4.6 | 5.2 | 3.6 |
| Blister size | 4.0 | 2.2 | 3.8 | 3.0 |
| Blister colour | 4.6 | 4.8 | 5.2 | 5.0 |
| Background colour | 6.4 | 4.8 | 6.2 | 5.8 |
| Melt appearance | 4.0 | 3.8 | 3.4 | 3.8 |
| Oil Off | 2.4 | 2.2 | 3.4 | 3.0 |
| Stretch length | 7.8 | 7.0 | 6.2 | 5.0 |
| Stretch type | 4.8 | 4.8 | 3.2 | 4.4 |
| Tenderness in mouth | 3.8 | 4.4 | 3.0 | 3.0 |
| Tenderness on chew | 4.8 | 6.2 | 3.2 | 3.0 |
| Moisture content (%) | 48.8 | 51.1 | 49.7 | 51.9 |

All gums:
K-C = Kappa carrageenan
LBG = Locus bean gum
Guar = Guar gum
added before pasteurisation at a concentration of 0.025 wt % in the cheese milk.

Results

From the results set out above in Table 4, it will be seen that all of the gums resulted in mozzarella cheese having improved functionality, and particularly a decreased blister size, decreased background colour and increased moisture content than the control cheese. K-carageenan overall gave the most pronounced effects.

Example 4

Mozzarella Cheese Made with Different Amounts of Kappa Carrageenan

The manufacturing protocol was as described in Example 1 above, and the functionality of each single cheese made was tested by the pizza test, as described above, when the cheeses were 12 weeks old. The score results in Table 5, below are the average of 3 evaluators.

TABLE 5

| | Functionality | | | | |
|---|---|---|---|---|---|
| Cheese type | Control | 0.015 wt % K-C | 0.020 wt % K-C | 0.025 wt % K-C | 0.030 wt % K-C |
| Blister coverage | 6.0 | 5.3 | 5.3 | 6.0 | 6.0 |
| Blister size | 6.0 | 4.7 | 4.0 | 4.0 | 4.0 |
| Blister colour | 6.3 | 6.0 | 6.0 | 6.3 | 3.3 |
| Background colour | 7.0 | 5.3 | 5.0 | 5.0 | 5.3 |
| Melt appearance | 5.7 | 5.7 | 5.7 | 5.7 | 5.7 |
| Oil off | 3.0 | 3.0 | 3.0 | 2.7 | 2.7 |
| Stretch length | 10.0 | 9.7 | 9.0 | 9.3 | 8.7 |
| Stretch type | 5.0 | 5.3 | 6.3 | 6.7 | 6.3 |
| Tenderness in mouth | 4.3 | 4.7 | 6.0 | 7.0 | 6.7 |
| Tenderness on chew | 5.7 | 6.0 | 6.3 | 6.7 | 7.7 |
| Moisture content (%) | 49.0 | 49.3 | 50.1 | 50.6 | 51.7 |

Results

From the results set out above in Table 5, it will be seen that increasing the level of gum added to the starting milk resulted in mozzarella cheese having increasingly improved functionality parameters. In particular, increased moisture content, decreased blister size, background colour (whiter), oil off and improved tenderness (initially and on chewing) resulted with increasing amounts of gum.

Example 5

Mozzarella Cheese Made with Mixtures of Gums

The manufacturing protocol was as described above, and the functionality of each single cheese made was tested by the pizza test, as described above, when the cheeses were 9 weeks old. The score results in Table 6, below, are the average of 3 evaluators.

TABLE 6

| | Functionality | | | |
|---|---|---|---|---|
| Cheese type | K-C (0.025%) | K-C/LBG (0.017/0.05 wt %) | K-C/LBG (0.017/0.008 wt %) | K-C/Guar (0.017/0.008 wt %) |
| Blister coverage | 4.7 | 4 | 4.0 | 3.7 |
| Blister size | 2.3 | 2.7 | 4.0 | 2.7 |
| Blister colour | 6.0 | 6.0 | 6.0 | 6.0 |
| Background colour | 4.7 | 4.7 | 5.0 | 5.0 |
| Melt appearance | 4.0 | 4 | 4.3 | 4.3 |
| Oil Off | 2.3 | 2.3 | 2.7 | 2.7 |
| Stretch length | 9 | 8.7 | 9.0 | 8.0 |
| Stretch type | 5.7 | 5.7 | 6.3 | 6.3 |
| Tenderness in mouth | 5.3 | 5.7 | 5.3 | 5.3 |

TABLE 6-continued

| | Functionality | | | |
|---|---|---|---|---|
| Cheese type | K-C (0.025%) | K-C/LBG (0.017/0.05 wt %) | K-C/LBG (0.017/0.008 wt %) | K-C/Guar (0.017/0.008 wt %) |
| Tenderness on chew | 6 | 6.7 | 6.0 | 6.3 |
| Moisture content (%) | 49.5 | 50.4 | 49.6 | 50.4 |

Results

From the results set out above in Table 6, it will be seen that the various gum mixtures added to the starting milk resulted in improved functional characteristics in mozzarella cheese, similar in magnitude to those produced with kappa carrageenan alone.

Example 6

Mozzarella Cheese Made with Different Fat Levels in Cheese Milk

The manufacturing protocol was as described above except that the fat in the starting cheese milk varied as set out in Table 7 below. Functionality of each single cheese made was tested by using the pizza test, as described above, on cheeses that were 9 weeks old. The score results in Table 7, below, are the average of 3-5 evaluators.

TABLE 7

| | Functionality | | | |
|---|---|---|---|---|
| Cheese type | Control | 0.025:K-C | Control | 0.025:K-C |
| % fat in cheese milk | 2.54 | 2.54 | 1.63 | 1.63 |
| Blister coverage | 7.0 | 6.0 | 9.0 | 7.7 |
| Blister size | 7.0 | 3.7 | 9.3 | 6.0 |
| Blister colour | 6.7 | 5.7 | 6.7 | 5.0 |
| Background colour | 7 | 4.7 | 7.0 | 4.7 |
| Melt appearance | 5.3 | 4.0 | 6.3 | 4.0 |
| Oil Off | 3.0 | 2.7 | 1.3 | 1.3 |
| Stretch length | 8.0 | 8.3 | 5.3 | 7.0 |
| Stretch type | 3.0 | 4.3 | 3.0 | 4.7 |
| Tenderness in mouth | 3.3 | 5.0 | 2.7 | 4.0 |
| Tenderness on chew | 3.0 | 6.3 | 2.0 | 4.3 |
| Moisture content (%) | 48.2 | 50.3 | 51.1 | 51.5 |
| % fat in cheese milk | 0.53 | 0.53 | 3.89 | 3.89 |
| Blister coverage | 0 | 0 | 3.6 | 3.0 |

TABLE 7-continued

| | Functionality | | | |
|---|---|---|---|---|
| Cheese type | Control | 0.025:K-C | Control | 0.025:K-C |
| Blister size | 0 | 0 | 3.4 | 1.8 |
| Blister colour | 1.2 | 1.2 | 5.8 | 5.2 |
| Background colour | 5.2 | 4.4 | 6.0 | 4.6 |
| Melt appearance | 1.6 | 2.0 | 6.0 | 6.4 |
| Oil Off | 1.0 | 1.0 | 6.2 | 3.2 |
| Stretch length | 3.2 | 5.8 | 7.6 | 6.8 |
| Stretch type | 2.0 | 2.8 | 5.8 | 6.6 |
| Tenderness in mouth | 2.0 | 2.6 | 4.6 | 5.4 |
| Tenderness on chew | 2.0 | 2.6 | 5.4 | 6.2 |
| Moisture content (%) | 54.4 | 55.6 | 43.2 | 46.3 |

Results

From the results set out above in Table 7, it will be seen that in general within each pair of fat levels where gum was added, there were overall improvements in functionality of the mozzarella cheese. In particular, blister coverage, blister size, background colour, oil off all decreased whilst tenderness (initially and on chewing) improved. Because of the low fat content of the Mozzarella made from the 0.53% fat containing milk, the surface of the molten cheese was heavily scabbed (no individual blisters) hence 0 scores for blister size and coverage. However background colour decreased in these cheeses and tenderness (initially and on chewing) improved in the low fat cheese with added gum compared to its Control. In all cases where gum was added cheese moisture (%) increased.

Example 7

Mozzarella Cheese Made by Adding Gum (0.025 wt % Kappa Carrageenan) Before and After Pasteurisation The manufacturing protocol was as described above. Functionality of each single cheese made was measured using the pizza test, as described above, on 12 week old cheeses. The score results in Table 8, below, are the average of 3 evaluators.

TABLE 8

| | Functionality | | |
|---|---|---|---|
| Cheese type | Control | Gum added before pasteurisation | Gum added after pasteurisation |
| Blister coverage | 6.0 | 5.3 | 4.7 |
| Blister size | 6.6 | 4.0 | 3.7 |
| Blister colour | 6.3 | 6.3 | 5.3 |
| Background colour | 7.3 | 5.0 | 5.0 |
| Melt appearance | 5.6 | 4.7 | 4.7 |
| Oil Off | 3.6 | 2.3 | 3.3 |
| Stretch length | 9.6 | 7.7 | 8.3 |
| Stretch type | 6.0 | 6.7 | 5.3 |
| Tenderness in mouth | 3.3 | 6.3 | 6.7 |
| Tenderness on chew | 4.0 | 6.7 | 5.7 |
| Moisture content (%) | 47.9 | 49.4 | 49.8 |

Results

From the results set out above in Table 8, it will be seen that gum added before and after pasteurisation resulted in mozzarella cheese with reduced blister size, blister cover and oil off and improved tenderness (both initially and on chewing) in the pizza test compared to the control. Background colour was also reduced where the gum was added before or after pasteurisation.

Example 8

Comparison of Mozzarella Cheese Made by Adding Different Levels of Guar Gum Before and After Pasteurisation The manufacturing protocol was as described above. Functionality was measured using the pizza test on 6 week old cheeses. The score results below in Table 9 are the average of 5 evaluators.

TABLE 9

| | Functionality | | | |
|---|---|---|---|---|
| | Before pasteurisation | | After pasteurisation | |
| Cheese type | Control | 0.15% Guar | Control | 0.15% Guar |
| Blister coverage | 4.2 | 4.4 | 4.2 | 6.0 |
| Blister size | 4.2 | 3.2 | 4.2 | 5.2 |
| Blister colour | 6.4 | 6.4 | 6.4 | 7.0 |
| Background colour | 7.6 | 5.6 | 7.6 | 7.6 |
| Melt appearance | 5.2 | 4.2 | 5.2 | 4.6 |
| Oil Off | 3.8 | 3.0 | 3.8 | 1.8 |
| Stretch length | 9.0 | 6.4 | 9.0 | 7.4 |
| Stretch type | 4.6 | 4.2 | 4.6 | 4.2 |
| Tenderness in mouth | 3.0 | 3.0 | 3.0 | 3.0 |
| Tenderness on chew | 3.8 | 4.0 | 3.8 | 3.4 |
| Moisture content (%) | 48.1 | 50.8 | 48.1 | 52.2 |

Results

From the results set out above in Table 9, it will be seen that gum added (0.15% guar) before and after pasteurisation increased the moisture content of the final cheese and reduced oil off. Blister size and background colour was also reduced when the gum was added before pasteurisation.

Example 9

Comparison of Mozzarella Cheese Made Using Different Fat Levels and 0.025 wt % Kappa Carrageenan Before and After Pasteurisation The manufacturing protocol was as described above. Functionality was measured using the pizza test on 6 week old cheeses. The score results below in Table 10, are the average of 5 evaluators.

TABLE 10

| | Functionality | | | | | |
|---|---|---|---|---|---|---|
| | Before pasteurisation | | | After pasteurisation | | |
| Cheese type | Control | 0.5% fat | 3.89% fat | Control | 0.5% fat | 3.89% fat |
| Blister coverage | 0 | 0 | 3.0 | 3.6 | 0 | 3.2 |
| Blister size | 0 | 0 | 1.8 | 3.4 | 0 | 2.4 |
| Blister colour | 1.2 | 1.2 | 5.2 | 5.8 | 1.2 | 5.4 |
| Background colour | 5.2 | 4.4 | 4.6 | 6.0 | 4.4 | 5.2 |
| Melt appearance | 1.6 | 2.0 | 6.4 | 6.0 | 2 | 6.8 |
| Oil Off | 1.0 | 1.0 | 3.2 | 6.2 | 1 | 6.6 |
| Stretch length | 3.2 | 5.8 | 6.8 | 7.6 | 6.2 | 8 |
| Stretch type | 2.0 | 2.8 | 6.6 | 5.8 | 3.4 | 6 |
| Tenderness in mouth | 2.0 | 2.6 | 5.4 | 4.6 | 2.6 | 5.4 |
| Tenderness on chew | 2.0 | 2.6 | 6.2 | 5.4 | 3.2 | 6 |
| Moisture content (%) | 54.4 | 55.6 | 46.3 | 43.2 | 56.3 | 45.4 |

Results

From the results set out above in Table 10, it will be seen that, within a fat level and with the exception of oil off in the high fat version, cheese made where the gum was added before or after pasteurisation gave similar improvements in functional characteristics.

CONCLUSIONS

The present invention provides a process of making mozzarella cheese whereby gum is added to the staring milk before or after pasteurisation. Such a process results in improved functionality characteristics of the gum containing cheeses. Gum added at various levels, to milks with a range of fat contents, before or after pasteurisation, increases moisture levels in the final cheese and reduces blister size, blister cover, oil off and transparency of the molten cheese on a pizza. Background colour of the molten cheese is whiter and tenderness (initially and on chewing) is improved. In addition cheese yield (moisture) and the window of functional acceptance is increased and shredability and diceability improved by the addition of gums.

INDUSTRIAL APPLICATION

The processes of the present invention and cheese made using the processes have commercial application in the pizza making industry that utilises mozzarella and mozzarella-like (pizza) cheese in significant quantities.

It will be appreciated that it is not intended to limit the invention to the above examples only, many variations, such as might readily occur to a person skilled in the art being possible without departing from the scope of the appended claims.

What we claim is:

1. A process of making cheese comprising the steps:
   a. providing a starting milk composition having a selected protein and fat composition, wherein said starting milk is standardized to give a protein:fat ratio of between about 0.5:1 and 6.0:1;
   b. adding a gum preparation to the starting milk composition of step a;
   c. pasteurising the milk composition of step b;
   d. adding a starter culture and/or acid (organic or mineral) to the milk composition to form a cheese milk;
   e. coagulating the cheese milk composition;
   f. cuffing the coagulum to separate curd and whey;
   g. draining away the whey from the curd; and
   h. shaping and cooling the curd;
   wherein the starting milk has a fat content of between about 0.5-6.0% to give a fat concentration in the final cheese product of between about 4-30 wt %.

2. A process as claimed in claim 1, wherein the cheese is selected from the group comprising soft, semihard, hard and extra hard cheeses.

3. A process as claimed in claim 1, comprising a further step between step g and step h of heating and stretching the curd at a curd temperature of between 50° C. to 80° C.

4. A process as claimed in claim 3, wherein the cheese produced is a mozzarella or mozzarella-like (pizza) cheese.

5. A process of making mozzarella or mozzarella-like (pizza) cheese comprising the steps:
   a. providing a starting milk composition having a selected protein and fat composition, wherein said starting milk is standardized to give a protein:fat ratio of between about 0.5:1 and 6.0:1;
   b. adding a gum preparation to the starting milk composition of step a;
   c. pasteurising the milk composition of step b;
   d. adding a starter culture and/or acid (organic or mineral) to the milk composition to form a cheese milk;
   e. coagulating the cheese milk composition;
   f. cutting the coagulum to separate curd and whey;
   g. draining away the whey from the curd;
   h. heating and stretching the curd at a curd temperature of between about 50° C. to 80° C.; and
   i. shaping and cooling the curd;
   wherein the starting milk has a fat content of between about 0.5-6.0% to give a fat concentration in the final cheese product of between about 4-30 wt %.

6. A process as claimed in claim 1, wherein the starting milk is selected from one or more of the group consisting of whole fat milk; semi skimmed milk; skimmed milk; butter milk; buffer milk retentate/concentrate; whey protein retentate/concentrate; reconstituted whole milk powder, skimmed milk powder, whey protein concentrate powder, whey protein isolate powder, buttermilk powder or other powders made from milk; and dry powdered milk products reconstituted with any of the above liquid milk products.

7. A process as claimed in claim 6, wherein the starting milk is sourced from any milk producing animal.

8. A process as claimed in claim 1, wherein the gum comprises one or more of the group consisting of carageenans, including kappa carrageenan, iota carrageenan, and lambda carrageenan, locust bean gum, alginate, xanthan, cellulose gum, guar, and any other suitable hydrocolloid.

9. A process as claimed in claim 8, wherein the gum is a carrageenan.

10. A process as claimed in claim 9, wherein the gum is predominantly kappa carrageenan.

11. A process as claimed in claim 1, wherein the gum is added as a dry powder or as a solution.

12. A process as claimed in claim 1, wherein the concentration of gum in the starting milk is between about 0.005-0.25 wt %.

13. A process as claimed in claim 12, wherein the concentration of gum in the starting milk is between about 0.010-0.2 wt %.

14. A process as claimed in claim 13, wherein the concentration of gum in the starting milk is between about 0.015-0.15 wt %.

15. A process as claimed in claim 1, wherein the gum concentration in the starting milk is between about $1.00\text{-}100\times10^{-3}$ g/g of protein.

16. A process as claimed in claim 15, wherein the gum concentration in the starting milk is between about $1.4\text{-}60\times10^{-3}$ g/g of protein.

17. A process as claimed in claim 16, wherein the gum concentration in the starting milk is between about $4.0\text{-}45\times10^{-3}$ g/g of protein.

18. A process as claimed in claim 3, wherein the curd is heated and stretched at a curd temperature of between about 50° C. to 80° C. in hot water or hot whey.

19. A process as claimed in claim 3, wherein the curd is heated and stretched in a substantially dry environment at a curd temperature of between about 50° C. to 80° C.

20. A process as claimed in claim 1, wherein at least one additive common in the cheese making industry is added at any suitable step in the process, wherein said at least one additive is selected from the group consisting of non-dairy ingredients such as stabilisers, emulsifiers, natural or artificial flavours, colours, starches, water, additional gums, lipases, proteases, mineral and organic acid, structural protein, including soy protein and wheat protein, anti microbial agents, and dairy ingredients.

21. A process of making cheese comprising the steps:
   a. providing a starting milk compositions having a selected protein and fat composition, wherein said starting milk is standardized to give a protein:fat ratio of between about 0.5:1 and 6.0:1;
   b. pasteurising the starting milk composition of step a;
   c. adding a gum preparation to the milk composition of step b;
   d. adding a starter culture and/or acid (organic or mineral) to the milk composition to form a cheese milk composition;
   e. coagulating the cheese milk composition;
   f. cutting the coagulum to separate curd and whey;
   g. draining away the whey from the curd; and
   h. shaping and cooling the curd;
   wherein the starting milk has a fat content of between about 0.5-6.0% to give a fat concentration in the final cheese product of between about 4-30 wt %.

22. A process as claimed in claim 21, wherein the cheese is selected from the group comprising soft, semihard, hard and extra hard cheeses.

23. A process as claimed in claim 21, comprising a further step between step g and step h of heating and stretching the curd at a curd temperature of between 50° C. and 80° C.

24. A process as claimed in claim 23, wherein the cheese is mozzarella or mozzarella-like (pizza) cheese.

25. A process of making a mozzarella or mozzarella-like (Pizza) cheese comprising the steps:
   a. providing a starting milk composition having a selected protein and fat composition, wherein said starting milk is standardized to give a protein:fat ratio of between about 0.5:1 and 6.0:1;
   b. pasteurising the starting milk composition of step a;
   c. adding a gum preparation to the milk composition of step b;
   d. adding a starter culture and/or acid (organic or mineral) to the milk composition to form a cheese milk composition;
   e. coagulating the cheese milk composition;
   f. cutting of the coagulum to separate curd and whey;
   g. draining away the whey from the curd;
   h. heating and stretching the curd at a curd temperature of between about 50° C. to 80° C.; and
   i. shaping and cooling the curd;
   wherein the final curd product has a fat content of between about 4-30 wt %.

26. A process as claimed in claim 21, wherein the starting milk is selected from one or more of the group comprising whole fat milk; semi skimmed milk; skimmed milk; butter milk; butter milk retentate/concentrate; whey protein retentate/concentrate; reconstituted whole milk powder, skimmed milk powder, whey protein concentrate powder, whey protein isolate powder, buttermilk powder or other powders made from milk; and dry powdered milk products reconstituted with any of the above liquid milk products.

27. A process as claimed in claim 26, wherein the starting milk is sourced from any milk producing animal.

28. A process as claimed in claim 21, wherein the gum is selected from one or more of the group consisting of carageenans, including kappa carrageenan, iota carrageenan, and lambda carrageenan, locust bean gum, alginate, xanthan, cellulose gum, guar, and any other suitable hydrocolloid.

29. A process as claimed in claim 28, wherein the gum is a carrageenan.

30. A process as claimed in claim 29, wherein the gum is predominantly kappa carrageenan.

31. A process as claimed in claim 21, wherein the gum is added as a dry powder or a solution.

32. A process as claimed in claim 21, wherein the concentration of gum in the starting milk is between about 0.005-0.25 wt %.

33. A process as claimed in claim 32, wherein the concentration of gum in the starting milk is between about 0.010-0.2 wt %.

34. A process as claimed in claim 33, wherein the concentration of gum in the starting milk is between about 0.015-0.15 wt %.

35. A process as claimed in claim 21, wherein the gum concentration in the starting milk is between about $1.00\text{-}100\times10^{-3}$ g/g of protein.

36. A process as claimed in claim 35, wherein the gum concentration in the starting milk is between about $1.4\text{-}60\times10^{-3}$ g/g of protein.

37. A process as claimed in claim 36, wherein the gum concentration in the starting milk is between about $4.0\text{-}45\times10^{-3}$ g/g of protein.

38. A process as claimed in claim 23 wherein the curd is heated and stretched at a curd temperature of between about 50° C. to 80° C. in hot water or hot whey.

39. A process as claimed in claim 23 wherein the curd is heated and stretched in a dry environment at a curd temperature of between about 50° C. to 80° C.

40. A process as claimed in claim 21, wherein at least one additive common in the cheese making industry is added at any suitable step in the process, wherein said at least one additive is selected from the group consisting of non-dairy ingredients such as stabilizers, emulsifiers, natural or artificial flavours, colours, starches, water, additional gums, lipases, proteases, mineral and organic acid, structural protein, including soy protein and wheat protein, anti microbial agents, and dairy ingredients.

* * * * *

UNITED STATES PATENT AND TRADEMARK OFFICE
CERTIFICATE OF CORRECTION

| | | |
|---|---|---|
| PATENT NO. | : 7,604,825 B2 | Page 1 of 1 |
| APPLICATION NO. | : 10/381532 | |
| DATED | : October 20, 2009 | |
| INVENTOR(S) | : Keith Johnston et al. | |

It is certified that error appears in the above-identified patent and that said Letters Patent is hereby corrected as shown below:

On the Title Page, item 57 (Abstract), please change "mil,m" to --milk--

In column 1, line 7, please change "Sep. 24, 2002" to --Sep. 24, 2001--

In column 1, line 9, please change "Sep. 24, 2001." to --Sep. 22, 2000.--

In column 3, line 31, please change "is relatively" to --relatively--

In column 4, line 59, please change "staring" to --starting--

In column 5, line 18, please change "themophilus," to --thermophilus,--

In column 5, line 34, please change "(eg" to --(e.g.--

In column 5, line 37, After "art" insert --.--

In column 5, line 59, please change "(eg" to --(e.g.--

In column 7, line 3, After "composition" insert --;--

In column 7, line 46, please change "is colours," to --colours,--

In column 7, line 64, please change "oiloff" to --oil off--

In column 8, line 26, please change "(eg" to --(e.g.--

In column 11, line 2, please change "K-carageenan" to --K-carrageenan--

In column 15, line 32, please change "staring" to --starting--

In column 15, line 43, please change "shredability" to --shedability--

In claim 1, column 16, line 24, please change "cuffing" to --cutting--

In claim 6, column 16, line 62, please change "buffer" to --butter--

In claim 8, column 17, line 4, please change "carageenans," to --carrageenans,--

In claim 21, column 17, line 48, please change "compositions" to --composition--

Signed and Sealed this

Twenty-third Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,604,825 B2  Page 1 of 1
APPLICATION NO. : 10/381532
DATED : October 20, 2009
INVENTOR(S) : Johnston et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 548 days.

Signed and Sealed this

Fifth Day of October, 2010

David J. Kappos
*Director of the United States Patent and Trademark Office*